United States Patent [19]

Lupke

[11] Patent Number: 4,995,800
[45] Date of Patent: Feb. 26, 1991

[54] EXTRUSION DIE ASSEMBLY

[76] Inventor: Manfred A. A. Lupke, 92 Elgin St., Thornhill, Ontario, Canada, L3T 1W6

[21] Appl. No.: 415,586

[22] Filed: Oct. 2, 1989

[30] Foreign Application Priority Data

Oct. 11, 1988 [CA] Canada ................................ 579800

[51] Int. Cl.⁵ ............................................. B29C 47/06
[52] U.S. Cl. ............................. 425/131.1; 425/133.1; 425/466
[58] Field of Search ............... 425/467, 466, 380, 381, 425/382.4, 133.1, 131.1, 326.1

[56] References Cited

U.S. PATENT DOCUMENTS

| 2,859,476 | 11/1958 | Lainson | 425/466 X |
| 3,899,276 | 8/1975 | Sokolow | 425/467 X |
| 4,061,461 | 12/1977 | Hessenthaler | 425/467 X |
| 4,185,954 | 1/1980 | Murakami et al. | 425/467 X |
| 4,268,239 | 5/1981 | Herrington, Jr. | 425/467 |
| 4,305,703 | 12/1981 | Lupke et al. | 425/462 X |
| 4,500,284 | 2/1985 | Lupke | 425/133.1 X |
| 4,712,993 | 12/1987 | Lupke | 425/466 |
| 4,808,098 | 2/1989 | Chan et al. | 425/467 X |

Primary Examiner—Richard L. Chiesa
Attorney, Agent, or Firm—Leydig, Voit & Mayer

[57] ABSTRACT

The invention concerns an extrusion die assembly, especially for use where accurate centering of a mandrel is important. The assembly includes the first member having a mandrel projecting therefrom and an extrusion passage generally in line with the mandrel, which extrusion passsage is, at one end, of cross-section to conform with a passage carrying extrudate for the extrusion head and which merges, over its length, into an extrusion passage at the other end, at least partially surrounding the root of the mandrel. This member is adjustably located in an outer member, which together with the mandrel defines an extrusion nozzle. Since the extrusion passage passes through the first member, it is possible to provide positioning means for the first member and the mandrel without interfering with extrudate's flow.

5 Claims, 2 Drawing Sheets

EXTRUSION DIE ASSEMBLY

FIELD OF THE INVENTION

Background of the Invention

This invention relates to die assemblies. These assemblies are especially useful in the Production of thermoplastic tubing.

The invention is useful in die assemblies whenever centering of a mandrel is important. It may, for example, be used for the production of profiles or tubing of various types. It is especially useful when co-axial mandrels are used with extrusion of the same or different material about each mandrel.

Typically, an annular extrusion die comprises a nozzle member adapted for attachment to an extrusion head, the nozzle member having a delivery end, and a mandrel which is located within the nozzle member co-axially therewith, the mandrel defining with the delivery end, an annular extrusion orifice. When the extrusion head is axially in line with the extrusion nozzle, the mandrel is usually supported within the nozzle member by a spider or equivalent radially extending means. This manner of support has the disadvantage that the stream of thermoplastic material divided many times according to the number of "legs" of the spider, since the legs or support means extend across the flow path. The result of this division of flow is that the material is imperfectly distributed at the die orifice and weaknesses may result in the extruded product.

Moreover, the spider legs may be the only route for carrying fluids such as blowing air, cooling liquid, etc., to the central core. Especially in the case of cooling fluid, there is a danger of solidifying the plastic extrudate in the region of the spider legs. This is due to the necessity of channels through (the spider legs, which convey coolant, air, etc.), and so cool the spider legs excessively.

The disadvantage is all the more pronounced in the case of multiple die assemblies, wherein a plurality of co-axial dies are mounted in axially spaced relation along the path of flow. Another disadvantage of such a conventional die arrangement becomes apparent in cases where it is necessary to supply air for molding and/or cooling the extruded tubing as it is formed, for the air ducts must somehow be mounted within the nozzles and must inevitably interfere with the distribution of flow.

A spiderless assembly has been proposed in U.S. Pat. No. 4,305,703 issued Dec. 15, 1981 to Manfred A. A. Lupke, which disclosed a die assembly including a longitudinal stem part. In that patent, the mandrel has an internal flow passage to receive extrudate from a supply passage extending along the stem part and to deliver extrudate to an annular distribution chamber. The mandrel is located with respect to the stem portion by means of an externally threaded spigot of the mandrel which engages a socket of the stem portion. Centering is achieved by moving the die bushing. Thus, the position of the die is altered.

In apparatus having in-line extrudate feed, it is usually possible to centre an inner mandrel supported by a spider by centering screws acting directly on it. However, in apparatus as disclosed in U.S. Pat. No. 4,305,703, if centering screws are used, it will nullify the advantage obtained by avoiding the use of a spider support.

U.S. Pat. No. 4,500,284 to Manfred A.A. Lupke on Feb. 19, 1985 is concerned with a method of making double-walled pipe and discloses apparatus in which feed extrudate is from two side feed extrusion heads. An advantage of side feed extrusion heads is that extrudate may be fed directly into annular channels without the need to locate the central mandrel by means of a spider. However, the use of side feed extrusion heads produces stresses on the extrusion nozzle due to the pressure and direction of flow of the extrudate at right angles to the flow in the nozzle.

It is not possible to use adjusting bolts to center the inner mandrel in the apparatus of U.S. Pat. No. 4,500,284 or, indeed, generally any apparatus utilizing side feed extrusion heads. However, it is possible, and this is an advantage of this type of apparatus, to run air pipes or other feed pipes straight down the core of the central mandrel.

SUMMARY OF THE INVENTION

An attempt has now been made to devise apparatus where sensitive centering of an inner mandrel is possible without the disadvantages of either a supporting spider or side feed of extrudate.

Thus, according to the invention is provided an extrusion die assembly comprising an extrusion nozzle adapted to deliver extrudate around a mandrel from a generally in-line extrusion head; the extrusion nozzle comprising a generally hollow outer first member having open ends and a second member including a mandrel having a root and a free end projecting from the root into the first member to define a passage between the first member and the mandrel for delivery of extrudate; the second member including a passage at least partially surrounding the root of said mandrel adapted, at one end, to deliver extrudate to the passage between the mandrel and the first member, and at the other end, communicating with a further passage adapted to receive extrudate from an extrusion passage; engagement means being provided between the first member and the second member for communication of said passage at least partially surrounding the mandrel root with the passage between the mandrel and the first member; and adjustment means being provided adapted to adjust the position of the second member with respect to the first member, whereby the mandrel is adjustably centerable in the first member.

In one embodiment, an extrusion die assembly comprises an elongate extrusion nozzle adapted to deliver extrudate around a mandrel from a generally in-line extrusion head; the elongate extrusion nozzle comprising a generally cylindrical hollow outer first member having open ends and a second member including a mandrel having a root and a free end projecting from the root into the first member to define an annular passage between the first member and the mandrel for delivery of extrudate; the second member including an annular passage surrounding the root of said mandrel and opening at one end into an annular port in a first face of the second member for delivery of extrudate to the annular passage between the mandrel and the first member, and, at the other end, communicating with a further passage opening at a further port in a second face of the second member opposed from the first face for receipt of extrudate from an extrusion passage; engagement means being provided between the first member and the second member for the communication of the annular port with the annular passage between the mandrel and the first member; and adjustment means being provided adapted to adjust the position of the second member radially with respect to the first member, whereby the mandrel is adjustably centerable in the first member.

BRIEF DESCRIPTION OF THE DRAWINGS

An embodiment of the invention will now be described by way of example with reference to the drawing in which.

DESCRIPTION OF THE PREFERRED EMBODIMENT

Figure 1:
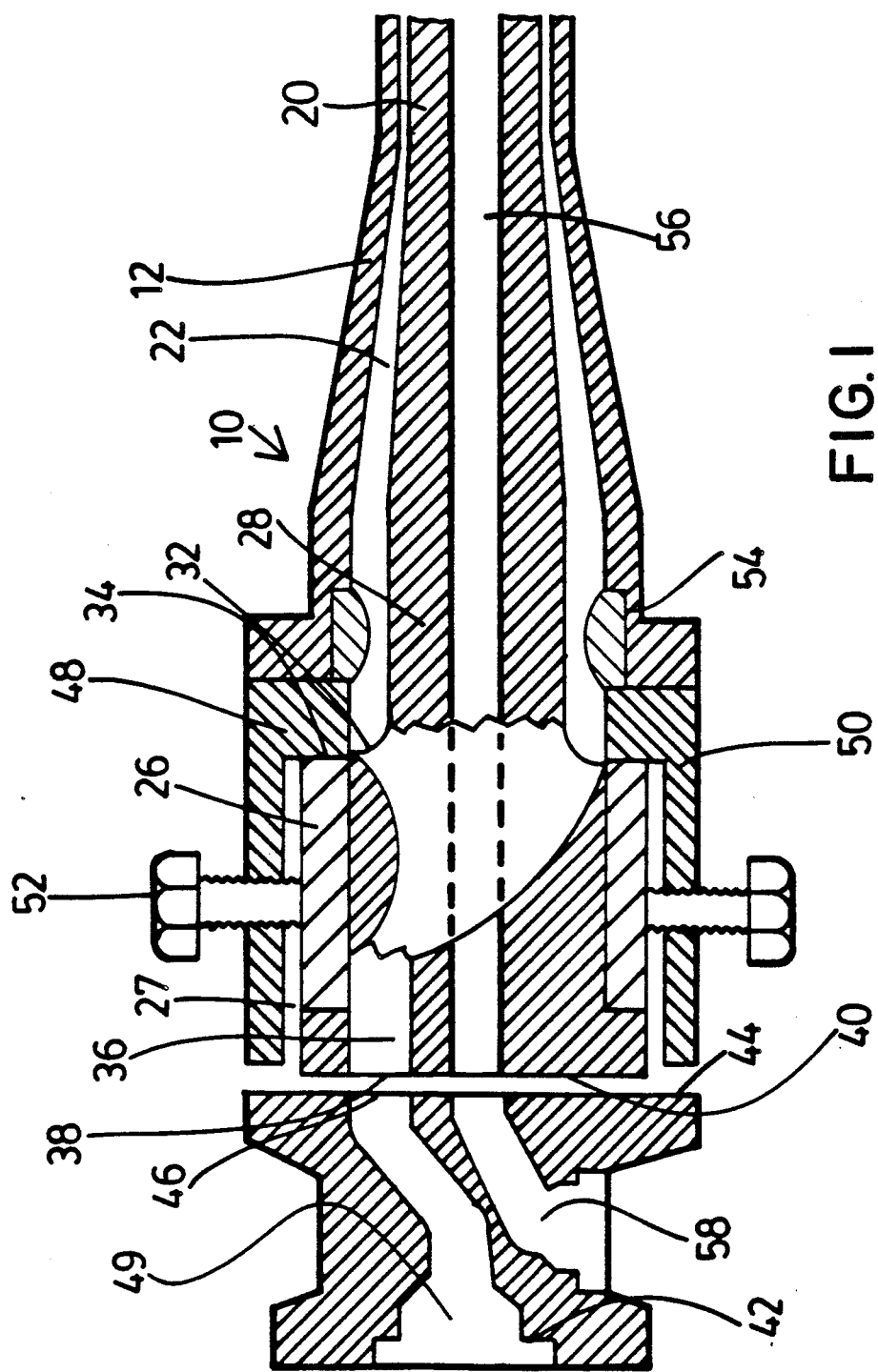
FIG. 1 shows a longitudinal section through a detail of a die assembly according to the invention, partly in elevation for simplicity.
Figure 2:
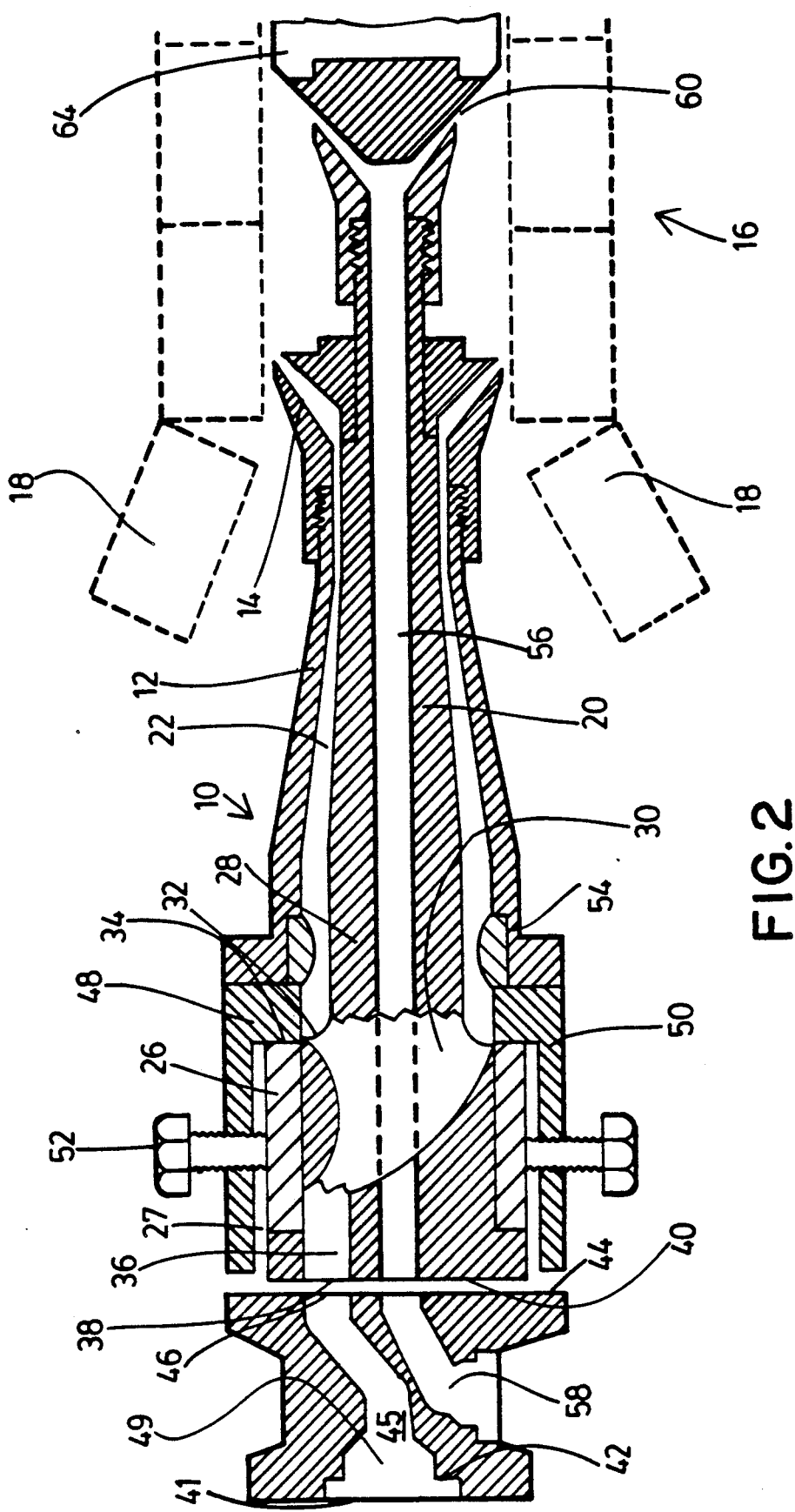
FIG. 2 is a more general view of the assembly.

The Figures show a die assembly comprising an elongate extrusion nozzle 10 comprising a first outer hollow cylindrical member 12 terminating at a free end in a die tip 14 within a mold tunnel 16. The mold tunnel is formed of cooperating pairs of mold blocks 18, each mold block 18 of a cooperating pair being one of an endless conveyor of mold blocks 18 forming the mold tunnel 16.

The mold blocks 18 may have mold faces which cooperate to form any tube, for example, ribbed tube having a lining tube of the same or different plastics material. Since the final form of the parison is not of importance in the present invention, no specific form of apparatus has been shown at the point of extrusion of the parison. It may be such as to produce corrugated tube in which case means must be provided to press the plastic uniformly into the corresponding corrugations of the mold face; it may be such as to produce plain tube; or it may be such as to produce other tube configurations.

The channel around the mandrel is discussed as an annular channel for the production of round tube but it may be of any shape, for example, for the production of square or other shape tube, or it may not entirely surround the mandrel root as for the production of C section or other sections.

In the embodiment shown, an elongate mandrel 20 is located axially within the cylindrical member first 12 defining an annular passage 22 for extrudate therebetween. The annular passage 22 opens into the mold tunnel to deliver extrudate thereinto to form the wall 24 of the resulting tube.

At the upstream end, the mandrel projects from a second member 26 at a root 28 surrounded by an annular passage 30. At one end, the annular passage 30 opens on annular face 34 of member 26 at an annular port 32 to communicate with annular passage 22 between the mandrel 20 and the outer member 12. At the other end, the annular passage 30 merges into cylindrical passage 36 axially parallel with annular passage 22. Cylindrical passage 36 opens at port 38 in a face 40 of member 26 opposed to face 34 to receive extrudate from the extrusion head.

To facilitate communication of passage 36 with an extrusion passage carrying molten thermoplastic extrudate, adaptor 42 may be used. Such an adaptor 42 has a face 44 including port 46 located to correspond with port 38 when the adaptor 42 and the member 26 are engaged together with faces 40 and 44 in contact with one another. Port 41 leads to passage 45 and thence to port 46 located to correspond to the position of a port of an extrusion head (not shown).

By changing adaptor 42 for another in which the path of passage 45 is different, a die assembly of the invention may be used with various extrusion heads. For example, if the path of passage 45 is right angled, then the die assembly may be used with a side feed extruder if desired but the extrudate will be presented to the annular passage from a direction generally aligned, or approaching alignment, with it. Thus, the use of apparatus according to the invention may help to mitigate stresses normally set up by the use of side feed die assemblies.

The outer hollow member 12 may have an enlarged socket end portion 48 around the member 26 and a bushing 50 therearound. Such socket portion may be integral with member 12 or separate from it and joined to it by any suitable means.

The internal dimensions of socket portion 48 are greater than the outer dimensions of member 26 so that the position of bushing 50 can be adjusted within socket 48 for sensitive centering of mandrel 20 in hollow member 12. The adjustment of member 26 is accomplished with a plurality of threaded adjustment bolts 52 spaced around the perimeter of socket 48 in screw threaded engagement therethrough to act on the bushing 50 surrounding member 26.

Bushing 50 comprises a sleeve extending around member 26 and having an end adjacent to the annular port 32. By suitable choice of bushing and adjustment of it, it is possible to mitigate any tendencY of extrudate flow back into the adjustment space 27 provided within the socket for adjustment of the position of member 26 therein.

Adjustment of the depth of insertion of bolts 52 may provide very fine centering adjustment of mandrel 20 without any movement of member 12.

Thus, it may be possible to adjust the apparatus very sensitively to ensure regular thickness of the wall of the parison produced by extrusion through the annular passage 22. Suitably, an exchangeable restriction bushing 54 is located in an annular groove on the inner surface of member 12 to provide for control of flow of extrudate.

The above-described arrangement not only may provide for fine adjustment of the mandrel 20 but also may allow for the provision of an axial straight bore 56 through mandrel 20 to open respectively at the face end of mandrel 20 and at face 40 of member 26.

Such an axial bore 56 is frequently necessary for use as either a further extrusion channel for transport of the same or another extrudate (as shown), or for carrying heating pipes, air pipes for blowing air to force the extrudate evenly against corrugations of the mold face for the formation of corrugated tube, other pipe s for treatment of the intention of the formed portion, etc.

As shown, the axial bore 56 communicates at the upstream end with an additional passage 58 in adaptor 42 to receive extrudate from a side feed extrusion head (not shown). At the downstream end, the axial bore 56 may diverge around a conical mandrel 60 supported from inside the mold tunnel 16 and being provided with heating plugs, cooling plugs 64, etc. as desired.

Thus, the apparatus shown may be used to deliver a first stream of extrudate through passage 49, passage 36, annular passage 30, and annular passage 22 to be extruded as a parison. Another stream of extrudate may be delivered from another extrusion head into passage 58 and from hence into straight passage 56 to form a second parison.

I claim:

1. An extrusion die assembly for fine adjustment of double walled tubing comprising an extrusion die head including an inner member having first and second parallel side-by-side inlet passages for extrudate leading thereinto, the inlet passages converting into inner end and outer coaxial outlet passages for extrudate leading there out of;

a mandrel projecting from the inner member, an extension passage of the inner passage extending through the mandrel to open at a free end thereof;

an outer member disposed about the inner member having centering means to adjust the position of the inner member and hence the mandrel; and a generally cylindrical, hollow, extension nozzle positioned about the mandrel, an annular nozzle extrusion passage being defined between the mandrel and the nozzle, one end of the extrusion nozzle being open for delivery of extrudate and the other end communicating the nozzle passage with the outer outlet passage.

2. An extrusion die assembly as claimed in claim 1 in which the first inlet passage, the inner outlet passage and the extension passage form a single continuous straight passage.

3. An extrusion die assembly as claimed in claim 1 which includes an adaptor for connecting the inner member to an extrusion head, the adaptor having first and second adaptor passages therethrough to communicate the first and second adaptor passages with respective extrudate outlets from at least one extrusion head.

4. A die assembly as claimed in claim 1 in which an exchangeable annular bushing is provided on an internal surface of the extrusion nozzle adjacent said other end, whereby extrudate in the annular passage between the outer member and the mandrel is restricted.

5. An extrusion die assembly for double walled tubing, comprising:

an extrusion head, a first extrudate inlet passage in said extrusion head, a second extrudate inlet passage in said extrusion head, said first and second passages being essentially parallel and in a side-by-side relationship in said head, a first outlet passage in fluid communication with said first extrudate inlet passage, a second outlet passage in fluid communication with said second extrudate inlet passage, said first and second outlet passages being contained within said extrusion head and being substantially coaxial to one another, a generally annular mandrel having an extrudate passage therethrough, a generally annular first extrusion nozzle die tip generally disposed about said mandrel and in fluid communication with one of said outlet passages and defining a first delivery outlet, a generally annular second extrusion nozzle die tip aligned with said mandrel and in extrudate communication with said mandrel extrudate passage and said other outlet passage, means for adjusting the position of said mandrel and second extrusion nozzle die tip relative to said first extrusion nozzle die tip and said extrusion head.

* * * * *

UNITED STATES PATENT AND TRADEMARK OFFICE
CERTIFICATE OF CORRECTION

PATENT NO. : 4,995,800
DATED : February 26, 1991
INVENTOR(S) : Manfred A.A. Lupke It is certified that error appears in the above-identified patent and that said Letters Patent is hereby corrected as shown below:

Column 5, line 5, delete "end".

Signed and Sealed this

Eighteenth Day of August, 1992

Attest:

DOUGLAS B. COMER

Attesting Officer

Acting Commissioner of Patents and Trademarks